US010619759B2

United States Patent
Ota et al.

(10) Patent No.: US 10,619,759 B2
(45) Date of Patent: Apr. 14, 2020

(54) DRAIN PLUG DEVICE

(71) Applicant: JAPAN ALPHA CO., LTD., Mie (JP)

(72) Inventors: Shinichi Ota, Mie (JP); Kohei Kitagawa, Mie (JP)

(73) Assignee: JAPAN ALPHA CO., LTD., Mie (JP)

( * ) Notice: Subject to any disclaimer, the term of this patent is extended or adjusted under 35 U.S.C. 154(b) by 164 days.

(21) Appl. No.: 15/287,398

(22) Filed: Oct. 6, 2016

(65) Prior Publication Data
US 2017/0023151 A1 Jan. 26, 2017

Related U.S. Application Data

(63) Continuation of application No. PCT/JP2015/062655, filed on Apr. 27, 2015.

(30) Foreign Application Priority Data

Jul. 11, 2014 (JP) .................................. 2014-142870

(51) Int. Cl.
*F16K 31/50* (2006.01)
*E03C 1/23* (2006.01)
(Continued)

(52) U.S. Cl.
CPC .............. *F16K 31/508* (2013.01); *A47K 1/14* (2013.01); *E03C 1/232* (2013.01); *E03C 1/2302* (2013.01);
(Continued)

(58) Field of Classification Search
CPC .... E03C 1/2304; E03C 1/2306; E03C 1/2302; E03C 1/232; E03C 1/24; E03C 2001/2315; F16K 1/04; F16K 31/508; A47K 1/14
(Continued)

(56) References Cited

U.S. PATENT DOCUMENTS 2,059,120 A * 10/1936 Kreuzer ................ E03C 1/2304
4/685
2,234,048 A * 3/1941 Groen .................... E03C 1/2304
4/685
(Continued)

FOREIGN PATENT DOCUMENTS

JP 59-152271 10/1984
JP 63-60333 3/1988
(Continued)

OTHER PUBLICATIONS

International Search Report dated Jul. 28, 2015 from PCT Application No. PCT/JP2015/062655.

Primary Examiner — Craig J Price
Assistant Examiner — Andrew J Rost
(74) Attorney, Agent, or Firm — Beyer Law Group LLP

(57) ABSTRACT

A drain plug device is provided with a plug lid, a mounting member inserted in an overflow port, an operation handle provided corresponding to an opening of the mounting member at one end thereof so as to protrude from a surface of a sidewall, a transmission member configured to transmit a driving force generated by a pivoting operation of the operation handle to the plug lid side, and a handle moving mechanism capable of moving the operation handle. The handle moving mechanism is configured to make an amount of protrusion of the operation handle with respect to the surface of the sidewall when the drain port is open smaller than an amount of protrusion of the operation handle with respect to the surface of the sidewall when the drain port is closed. Whereby a good draining efficiency at the overflow port side is secured when draining is performed therethrough.

8 Claims, 6 Drawing Sheets

(51) Int. Cl.
*A47K 1/14* (2006.01)
*E03C 1/232* (2006.01)
*F16K 1/04* (2006.01)

(52) U.S. Cl.
CPC .......... *E03C 1/2304* (2013.01); *E03C 1/2306* (2013.01); *F16K 1/04* (2013.01); *E03C 2001/2315* (2013.01)

(58) Field of Classification Search
USPC .............................................. 4/685; 251/229
See application file for complete search history.

(56) References Cited

U.S. PATENT DOCUMENTS

| | | | | |
|---|---|---|---|---|
| 2,910,704 | A * | 11/1959 | Ashby | E03C 1/23 4/685 |
| 4,085,469 | A * | 4/1978 | Petursson | E03C 1/2304 4/684 |
| 4,744,108 | A * | 5/1988 | Schmidt | E03C 1/232 4/685 |
| 4,796,310 | A | 1/1989 | Freville et al. | |
| 5,123,123 | A * | 6/1992 | Hart | E03C 1/232 16/441 |
| 7,984,521 | B2 * | 7/2011 | Schintler | E03C 1/2302 4/684 |
| 8,201,289 | B2 * | 6/2012 | Edmonds | E03C 1/232 4/680 |
| 8,336,131 | B2 * | 12/2012 | Ball | E03C 1/232 4/683 |
| 9,157,221 | B2 * | 10/2015 | Pan | E03C 1/232 |
| 2008/0155745 | A1 * | 7/2008 | Burr | E03C 1/232 4/683 |
| 2013/0042407 | A1 * | 2/2013 | Marotz | E03C 1/2304 4/679 |

FOREIGN PATENT DOCUMENTS

| | | |
|---|---|---|
| JP | 2006-9562 | 1/2006 |
| JP | 2012-241489 | 12/2012 |

* cited by examiner

DRAIN PLUG DEVICE

CLAIM OF PRIORITY

This application is a Continuation of International Patent Application No. PCT/JP2015/062655, filed on Apr. 27, 2015, which claims priority to Japanese Patent Application No. 2014-142870, filed on Jul. 11, 2014, each of which is hereby incorporated by reference.

BACKGROUND OF THE INVENTION

1. Field of the Invention

The present invention relates to a drain plug device for operating a plug lid for a drain port provided to a tank.

2. Description of the Related Art

Conventionally, an overflow port is sometimes provided to a side wall of a tank (for example, a bath tub) so as to prevent water from overflowing from the tank. Also, it is known that a drain plug device in which a plug lid provided to a drain port of the tank is remotely operated (to open or close the drain port) by providing a certain operation portion at an overflow port and remotely controlling the operation portion.

Such a drain plug device may include an operation handle rotatably (pivotably) provided to an overflow port, and a transmission member for transmitting a driving force generated by a rotation of the operation handle to a plug lid (for example, see Japanese Patent Laid-Open Publication No. 2006-9562). In accordance with the technology described in Japanese Patent Laid-Open Publication No. 2006-9562, water to be drained flows through a gap between a cover rosette corresponding to the operation handle and a sidewall of the tank, through an opening provided to the cover rosette, and then is drained from the overflow port.

However, in accordance with the above-mentioned technology, the cover rosette is always in such a state that the cover rosette is relatively largely protruding from the sidewall of the tank. Thus, it may interfere with the use of peripheral equipment of the tank such as a shower, making the use of the peripheral equipment troublesome to a certain extent (for example, a shower hose may be caught by the cover rosette when a shower head is moved). In addition, it is not aesthetically attractive for users to see the cover rosette always largely protruding from the sidewall of the tank, giving an untidy impression. In addition, such a largely protruding cover rosette is not a desirable condition for a safety reason, either.

On the other hand, there is an option to provide the operation handle (cover rosette) as close as possible to the sidewall so as to reduce an amount of protrusion of the operation handle (cover rosette) with respect to the sidewall. However, since this option also inevitably reduces the gap between the operation handle (cover rosette) and the sidewall, a draining efficiency at the overflow port side may become insufficient. Furthermore, it may become difficult to clean a portion located between the operation handle (cover rosette) and the sidewall.

BRIEF DESCRIPTION OF THE INVENTION

The present invention has been made in the light of the forgoing, and the object thereof is to provide a drain plug device which is improved in convenience, quality of appearance, safety, and cleaning easiness, as well as to secure a good draining efficiency at the overflow port side.

A system and mechanisms suitable for solving the above-mentioned problems will be explained below section by section. The functions and effects specific to respective mechanisms will also be described as appropriate.

A drain plug device in accordance with a first aspect is provided to a tank having a bottom wall, a sidewall standing from the bottom wall, a drain port provided to the bottom wall, and an overflow port provided to the sidewall. The drain plug device comprises (a) a plug lid configured to open and close the drain port by moving upward and downward with respect to the tank, respectively, (b) a mounting member inserted in the overflow port, the mounting member being provided with an opening at one end thereof and an inner space such that water in the tank enters from the opening and flows through the inner space, the mounting member having a brim portion extending outwardly and contacting directly or indirectly with a surface of the sidewall, (c) an operation handle provided corresponding to the opening of the mounting member so as to protrude from the surface of the sidewall, the operation handle being pivotable and having a peripheral portion extending outwardly beyond an outer circumference of the brim portion, (d) a transmission member configured to transmit a driving force generated by a pivoting operation of the operation handle to the plug lid so as to move the plug lid up and down, and (e) a handle moving mechanism capable of moving the operation handle along a protrusion direction of the operation handle with respect to the surface of the sidewall, wherein the handle moving mechanism is configured such that an amount of protrusion of the operation handle with respect to the surface of the sidewall when the drain port is open is smaller than an amount of protrusion of the operation handle with respect to the surface of the sidewall when the drain port is closed.

In accordance with the above-mentioned first aspect, when the drain port is open, that is, drainage is performed on the drain port side and no or little drainage is performed on the overflow port side (i.e., a draining efficiency at the overflow port side does not have to be considered), an amount of protrusion of the operation handle with respect to the surface of the sidewall of the tank is rather small. Accordingly, the operation handle is not such an obstacle that convenience in using peripheral equipment of the tank (for example, a shower) can be improved. In addition, an integration of the tank and the operation handle is enhanced, thereby providing a tidy and nice looking, and thus a good quality of appearance can be realized. Furthermore, since a risk of such a situation that a hand or the like is caught by the operation handle is reduced, safety can also be improved.

On the other hand, in accordance with the above-mentioned first aspect, when the drain port is closed with the plug lid, that is, the drainage may be performed through the overflow port side, the amount of protrusion of the operation handle becomes greater than the amount of protrusion when the drain port is open. Accordingly, a gap between the operation handle and the sidewall can be increased such that a sufficient draining efficiency at the overflow port side is guaranteed.

In other words, in accordance with the above-mentioned first aspect, when the drainage is performed on the drain port side and no or little drainage is performed on the overflow port side, the convenience in using the peripheral equipment, quality of appearance, and safety are effectively enhanced, while the draining efficiency at the overflow port side is greatly improved when the drainage may be performed at the overflow port side but not the drain port side.

Also, in accordance with the above-mentioned first aspect, cleaning of a portion between the operation handle and the side wall is made easier as the amount of protrusion of the operation handle becomes rather large.

In accordance with a second aspect of the drain plug device, in addition to the first aspect thereof, the handle moving mechanism includes (e1) a holder in a cylindrical shape provided to an inner circumference of the mounting member and extending along a moving direction of the operation handle, (e2) a shaft provided to an inner circumference of the holder behind the operation handle, the shaft being configured to pivot around a central axis thereof as a rotational axis in accordance with the pivoting operation of the operation handle, (e3) a holder-side contact portion provided to the inner circumference of the holder, and (e4) a shaft-side contact portion provided to an outer circumference of the shaft. The holder-side contact portion is in contact with the shaft-side contact portion, and at least one of the holder-side contact portion and the shaft-side contact portion is slanted with respect to a circumferential direction of the central axis. In addition, the shaft-side contact portion is configured to slide the holder-side contact portion in accordance with the pivoting operation of the operation handle, such that the amount of protrusion of the operation handle with respect to the surface of the sidewall is changed by a movement of the shaft along the central axis thereof.

In accordance with the above-mentioned second aspect, the handle moving mechanism is realized using a rather simple structure. Thus, a cost for manufacturing the device can be effectively reduced. A risk of troubles such as malfunction in the handle moving mechanism can also be reduced more certainly.

In accordance with a third aspect of the drain plug device, in addition to the first and second aspects thereof, the drain plug device further comprises a pivoting range regulation mechanism for regulating a range of the pivoting operation of the operation handle.

In accordance with the above-mentioned third aspect, the pivoting range of the operation handle is regulated by the pivoting range regulation mechanism. Thus, malfunction or breakdown of the device due to an over rotation of the operation handle is surely prevented.

In accordance with a fourth aspect of the drain plug device, in addition to any one of the first to third aspects thereof, the drain plug device further comprises a peripheral facing portion provided to an outer peripheral of the operation handle and facing the surface of the sidewall, the peripheral facing portion having a shape following the surface of the sidewall facing thereto when the operation handle is arranged at a position for opening the drain port.

In accordance with the above-mentioned fourth aspect, the peripheral facing portion of the operation handle can follow the surface of the sidewall facing thereto when the drain port is open. Therefore, when the drain port is open, the gap between the outer peripheral of the operation handle and the sidewall can further be reduced, whereby when the peripheral equipment of the tank is used, the operation handle is not an obstacle and thus convenience of the use is further enhanced. In addition, the integrity of the tank and the operation handle is dramatically improved, thereby realizing an extremely good quality of appearance. Furthermore, safety is also improved by reducing a risk of a situation in which a hand or the like is caught by the operation handle.

In accordance with a fifth aspect of the drain plug device, in addition to any one of the first to fourth aspect thereof, the amount of protrusion of the operation handle with respect to the surface of the sidewall is set such that the peripheral portion of the operation handle is positioned on a lateral side of the brim portion.

In accordance with the above-mentioned fifth aspect, when the drain port is open, the outer peripheral portion of the operation handle is arranged in a position that covers at least part of the lateral side of the brim portion. Thus, the amount of protrusion of the operation handle with respect to the sidewall is reduced to be sufficiently small so as to further enhance the convenience of use, safety, and the like.

Furthermore, since the operation handle hides the brim portion behind thereof, which provides a nicer looking, the quality of appearance is further improved.

In accordance with a sixth aspect of the drain plug device, in addition to the fifth aspect thereof, the drain plug device further comprises a buffer member which is elastically deformable. The buffer member is provided between the sidewall and the brim portion so as to be sandwiched therebetween, and the amount of protrusion of the operation handle with respect to the surface of the sidewall is set such that the peripheral portion of the operation handle is positioned on a lateral side of the buffer member.

In accordance with the above-mentioned sixth aspect, mounting stability of the mounting member with respect to the tank is improved by the buffer member.

On the other hand, when the buffer member is provided, a lower quality of appearance might be of a concern. However, in accordance with the above-mentioned sixth aspect, when the drain port is open, the peripheral portion of the operation handle is arranged so as to cover at least part of the lateral side of the buffer member. That is, when the drain port is open, the buffer member is hidden by the operation handle. Accordingly, it is possible to maintain advantages of providing the buffer member, while effectively eliminating disadvantages thereof.

In accordance with a seventh aspect of the drain plug device, in addition to any one of the first to sixth aspects thereof, the plug lid is moved downward by applying a downward force thereto when the drain port is open, thereby closing the drain port, while the operation handle pivots and protrudes such an amount that is greater than the amount of protrusion of the operation handle with respect to the surface of the sidewall when the drain port is open.

In accordance with the above-mentioned seventh aspect, a simple operation such as steeping on the plug lid can close the drain port, while the amount of protrusion of the operation handle become larger than the amount of protrusion of the operation handle when the drain port is open, whereby the convenience for a user is further improved.

DETAILED DESCRIPTION OF EMBODIMENTS OF THE INVENTION

Figure 1:
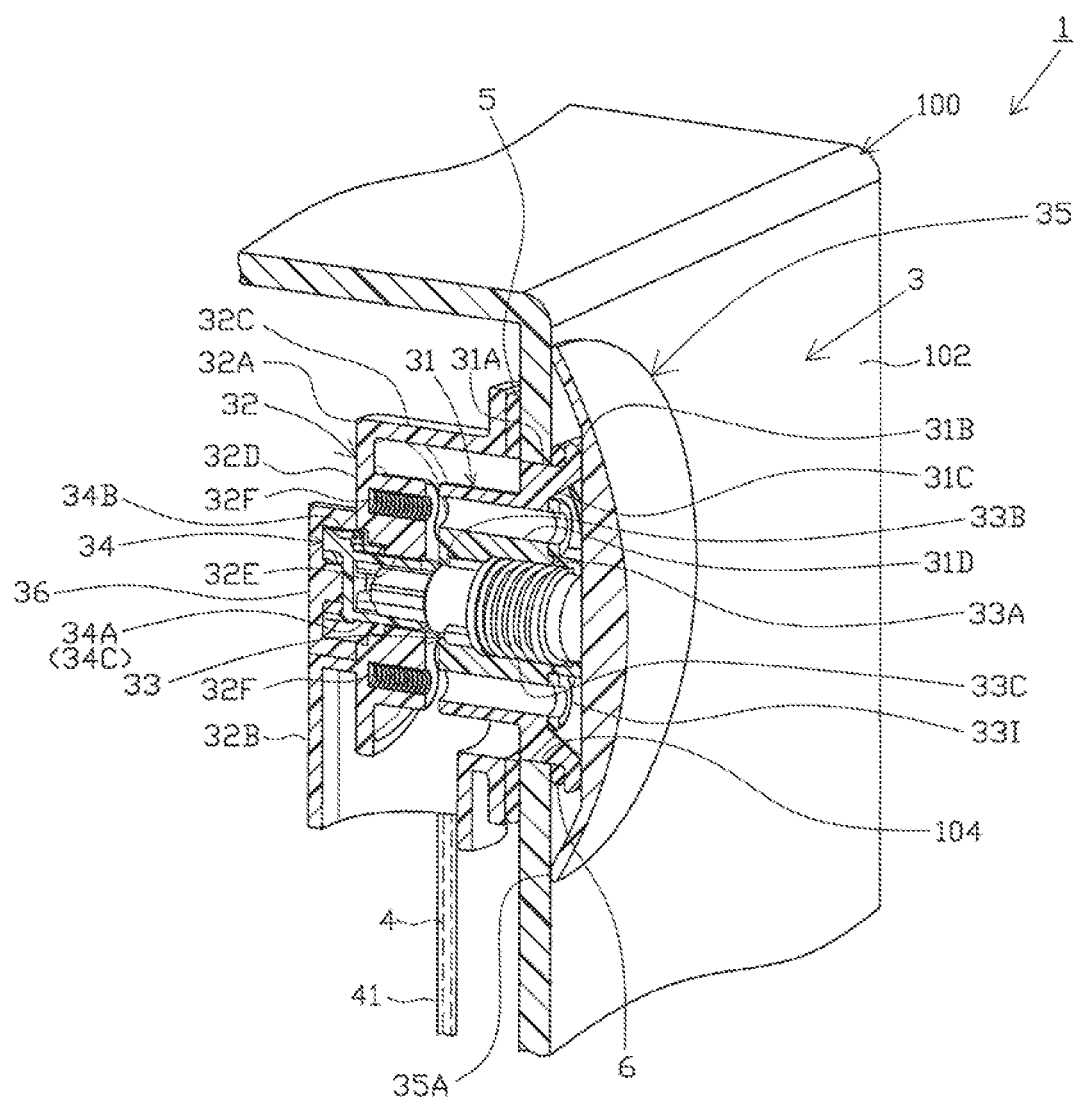
FIG. 1 is a diagram illustrating a partially cut-away perspective view showing a structure of a mechanism on an overflow port side.
Figure 2:
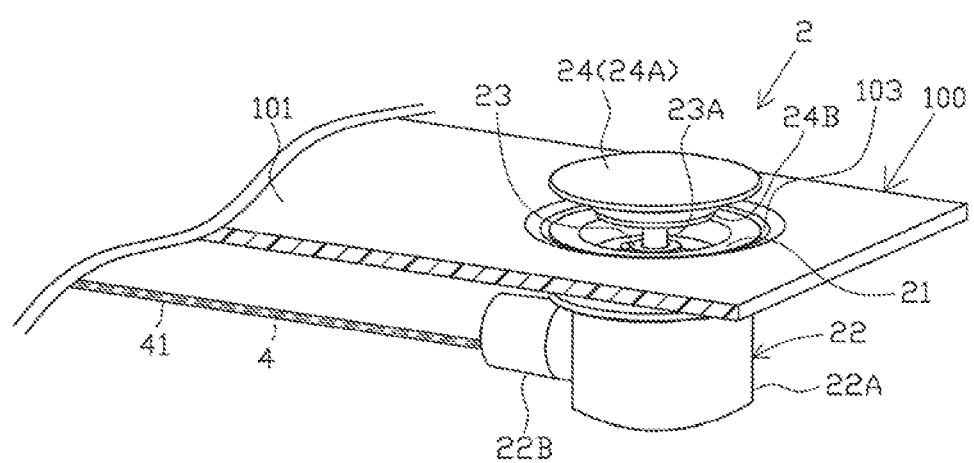
FIG. 2 is a diagram illustrating a partially cut-away perspective view showing a structure of a mechanism on a drain port side.

An embodiment of the present invention will be explained below by referring to drawings. In accordance with this embodiment, as shown in FIGS. 1 and 2, a drain plug device 1 includes a drain port side mechanism 2, an overflow port side mechanism 3, and a transmission member 4 provided therebetween and attached to a bath tub 100 as a tank. The bath tub 100 is a molded article having a bottom wall 101 and a sidewall 102 standing upright from an outer peripheral of the bottom wall 101. A drain port 103 for draining water from inside of the bath tub 100 is provided to the bottom wall 101, and an overflow port 104 for preventing overflow of the water from the bath tub 100 is provided to an upper portion of the sidewall 102.

First, the drain port side mechanism 2 is explained. As shown in FIG. 2, the drain port side mechanism 2 is provided to the drain port 103 and includes a drain port member 21, a drain pipe 22, a support shaft mechanism 23, and a plug lid 24.

The drain port member 21 is made of a predetermined resin and the like formed into a tubular shape, and is inserted into the drain port 103. The drain port member 21 holds the support shaft mechanism 23 inside thereof.

The drain pipe 22 is made of a predetermined resin formed into a tubular shape, and includes a main pipe 22A and a branch pipe 22B.

The main pipe 22A is of a tubular shape extending in a vertical direction and provided below the drain port member 21 so as to be coaxial with the drain port member 21. The water inside the bath tub 100 is drained through the inside of the drain port member 21 and the inside of the main pipe 22A.

The branch pipe 22B extends from an outer circumference of the main pipe 22A in a direction perpendicular to the extending direction of the main pipe 22A. In addition, the branch pipe 22B has an inside space which is in communication with an inside space of the main pipe 22A. The branch pipe 22B is connected to an overflow pipe 32 (to be explained below) provided in the overflow port side mechanism 3 via a predetermined piping (not shown in the drawings).

The support shaft mechanism 23 is configured such that an end of the transmission member 4 can be in contact therewith, and includes a support shaft 23A on a top end of which the plug lid 24 is attached. The support shaft 23A is configured to move up and down in accordance with a movement of the transmission member 4, such that the plug lid 24 moves up and down in accordance with the up-down movement of the support shaft 23A.

The plug lid 24 includes a disk-shaped plug lid main body 24A and a packing portion 24B provided on a back side of the plug lid main body 24A. When the plug lid 24 goes down as the support shaft 23A moves downward, the packing portion 24B comes into contact with a surface of the inner circumference of the drain port member 21, thereby closing the drain port 103. On the other hand, when the plug lid 24 goes up as the support shaft 23A moves upward, the packing portion 24B is separated from the surface of the inner circumference of the drain port member 21, thereby opening the drain port 103.

Figure 3:
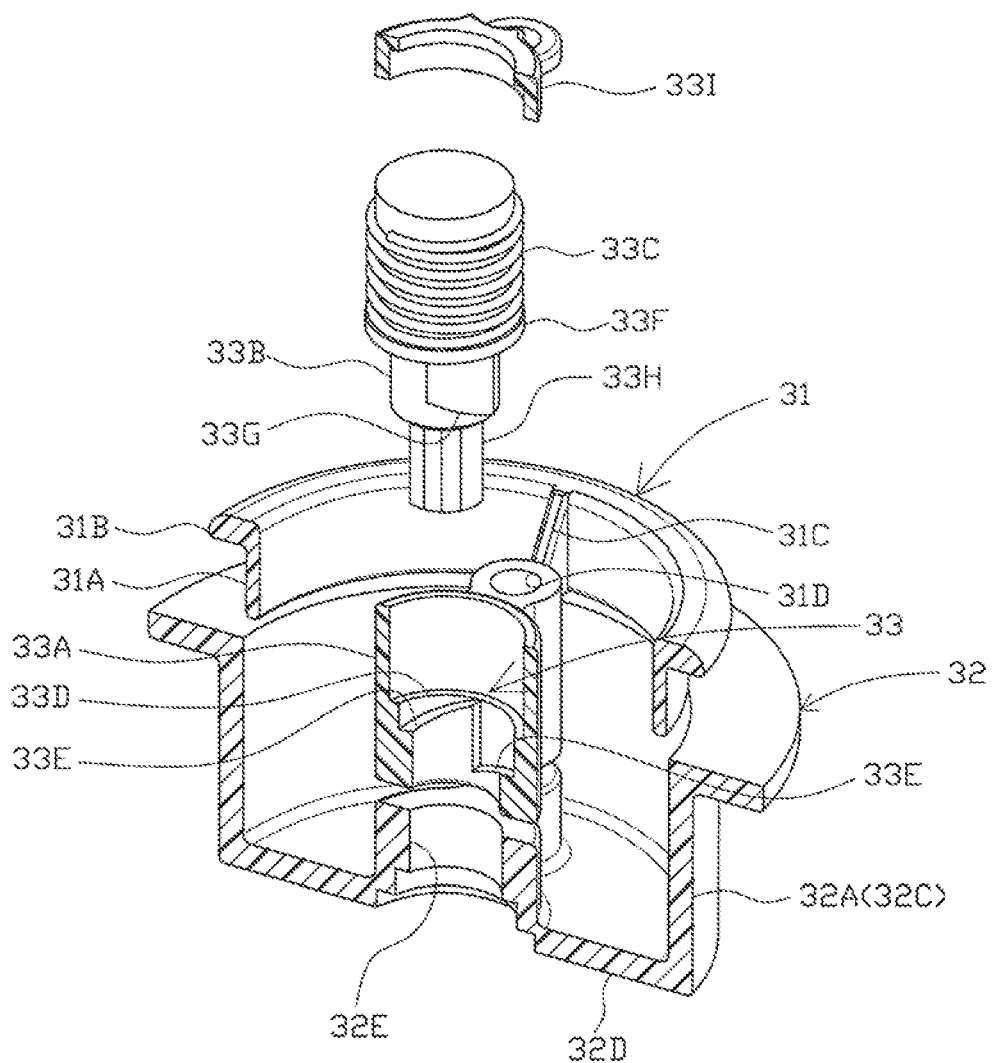
FIG. 3 is a diagram illustrating an exploded perspective view showing a mounting member, an overflow pipe, and a handle moving mechanism.

Next, the overflow port side mechanism 3 is explained. As shown in FIGS. 1 and 3, the overflow port side mechanism 3 is provided to the overflow port 104 and includes a mounting member 31, an overflow pipe 32, a handle moving mechanism 33, a pivot mechanism 34, and an operation handle 35.

The mounting member 31 is made of a predetermined resin formed into a tubular shape, and includes a main body 31A and a brim portion 31B.

The main body 31A is formed in a cylindrical shape and inserted into the overflow port 104. The main body 31A includes a plurality of arm portions 31C coupled to a holder 33A (to be described below) of the handle moving mechanism 33 so as to support the holder 33A. The arm portions 31C are provided along a circumferential direction of the main body 31A with an equal interval therebetween (there are two arm portions 31C in this embodiment). The water flowing from inside of the bath tub 100 through an opening at one end of the main body 31A (on a front side of the bath tub 100) into the inner space of the main body 31A is led into the overflow pipe 32 by flowing through a gap between the arm portions 31C.

An insertion hole 31D extending in the direction of the axis of the main body 31A is formed in the arm portions 31C at a holder 33A side thereof.

The brim portion 31B protrudes outwardly from an end of the main body 31A along the outer circumferential thereof, so as to be in indirectly contact with a surface of the sidewall 102 via a buffer member 6 which will be described below. However, the buffer member 6 may be omitted such that the brim portion 31B is directly in contact with the surface of the sidewall 102.

The overflow pipe 32 is made of a certain resin and formed into a tubular shape, and includes a first pipe 32A and a second pipe 32B.

The first pipe 32A includes a cylindrical portion 32C provided at one end thereof (on the overflow port 104 side) which has an inner diameter substantially the same as that of the overflow port 104, and a disk-like extension 32D provided at the other end of the cylindrical portion 32C so as to extend inwardly from the other end of the cylindrical portion 32C in the radial direction. The extension 32D has a though-hole 32E passing therethrough at a center portion thereof, and a plurality of female screws 32F (two, in this embodiment) disposed adjacent to the through-hole 32E and extending in a direction in which the through-hole 32E extends.

In this embodiment, the mounting member 31 and the overflow pipe 32 are attached to the sidewall 102 by sandwiching the sidewall 102 between the brim portion 31B and the one end of the first pipe 32A, and inserting predetermined male screws (not shown in drawings) into the insertion hole 31D so as to engage with the female screws 32F.

In addition, a ring-shaped sealing member 5 made of an elastically deformable material (such as a rubber, resin, or the like) is provided between the one end of the first pipe 32A and a back surface of the sidewall 102 such that the sealing member 5 is sandwiched between the over flow pipe 32 and the sidewall 102. This prevents water from leaking from the overflow pipe 32 to outside thereof.

Furthermore, a ring-shaped buffer member 6 made of an elastically deformable material (such as a rubber, resin, or the like) is sandwiched between the brim portion 31B and the surface of the sidewall 102. The buffer member 6 provides secure and stable attachment of the mounting member 31 and the over flow pipe 32 to the sidewall 102.

The second pipe 32B extends downwardly in the longitudinal direction, and an inner space thereof is in communication with the inner space of the first pipe 32A. The piping, to which the branch pipe 22B is connected, is coupled to the second pipe 32B. The waste water flows though inside of the mounting member 31 into the overflow pipe 32, further flows though the piping and the branch pipe 22B into the main pipe 22A, and then is discharged.

The handle moving mechanism 33 includes a cylindrical holder 33A provided inside the main body 31A etc. and supported by the arm portions 31C, a shaft 33B provided inside the holder 33A, and an elastic member 33C provided between the holder 33A and the shaft 33B.

The holder 33A is arranged to be coaxial with the though-hole 32E when the mounting member 31 and the overflow pipe 32 are attached to the sidewall 102. The inner wall of the holder 33A is provided with a ring-shaped step portion 33D extending along the inner circumferential direction thereof, and a plurality of holder-side contact portions 33E (two, in this embodiment) which are slopes inclined with respect to a circumferential direction of the central axis of the shaft 33B. The holder-side contact portions 33E are positioned on the other end side (the opposite side of the overflow port 104) of the step portion 33D. In this embodiment, each of the holder-side contact portions 33E is formed as approximately a semicircle worth of a spiral.

The shaft 33B is pivotable around the central axis thereof as a rotational axis inside the holder 33A. The shaft 33B includes a brim-like, ring-shaped protrusion 33F, shaft-side contact portions 33G positioned closer to the other end than the ring-shaped protrusion 33F, and a spline portion 33H positioned closer to the other end than the shaft-side contact portions 33G.

The ring-shaped protrusion 33F is in contact with another end of the elastic member 33C so as to support the elastic member 33C.

The shaft-side contact portions 33G (two in this embodiment) are provided at a plurality of positions so as to sandwich the central axis of the shaft 33B therebetween. The shaft-side contact portions 33G are slopes inclined with respect to a circumferential direction of the central axis of the shaft 33B in the same direction as the holder-side contact portions 33E, and are in surface contact with the holder-side contact portions 33E. It is also possible to provide a single shaft-side contact portion 33G.

The spline portion 33H has a cross-like shape in a cross-sectional view, and is inserted into an interlock portion 34 (to be described below) of the pivot mechanism 34. The spline portion 33H is slidable along the axis direction of the shaft 33B but is incapable of relative rotation.

The elastic member 33C is formed of a flexible and deformable spring member, and provided between a lid portion 33I fixed to one end of the mounting member 31 by the male screws and the ring-shaped protrusion 33F in a contracted state. Accordingly, the shaft 33B is biased toward the other end (the opposite side of the overflow port 104), and as a result, the shaft-side contact portion 33G is always pushed against the holder-side contact portion 33E.

The pivot mechanism 34 includes the interlock portion 34A having a gear portion 34B and a connection portion 34C which are coaxially provided, and a rack portion (not shown in the figures) connected to the other end of the transmission member 4 (see FIG. 1).

The interlock portion 34A is pivotable and provided coaxially with the shaft 33B. The interlock portion 34A is held by a case 36 attached to the overflow pipe 32.

The gear portion 34B has a plurality of gear teeth on its outer circumference. The connection portion 34C has a cylinder shape and an inner space thereof has a cross-like cross section. The spline portion 33H is inserted in the inner space of the connection portion 34C, and when the shaft 33B pivots, the interlock portion 34A (the gear portion 34B) also pivots along with the shaft 33B. In this embodiment, protrusions (not shown in the figures) are formed on an outer circumference of the gear portion 34B, which can be in contact with the inner surface of the case 36.

The rack portion is formed in a stick-like shape, is provided with a plurality of teeth on its side face, and is configured to reciprocate along the longitudinal direction thereof. The teeth of the rack portion are engaged with the gear teeth of the gear portion 34B such that the rack portion reciprocates in accordance with the pivot operation of the gear portion 34B. In accordance with the reciprocation of the rack portion, the transmission member 4 connected thereto reciprocates.

The operation handle 35 is used in order to move the plug lid 24 up and down so as to open and close the drain port 103. The operation handle 35 is a disk-like protrusion having a curved surface, and projecting from the surface of the sidewall 102. One end of the shaft 33B is attached to the center portion of the back side of the operation handle 35 such that the shaft 33B pivotably supports the operation handle 35.

The operation handle 35 is disposed in a position corresponding to the opening of the mounting member 31 provided the one end thereof. More specifically, when the overflow port side mechanism 3 is viewed from a water-containing space of the bath tub 100 so as to face the surface of the operation handle 35, the operation handle 35 is positioned so as to overlap the opening of the mounting member 31. In this embodiment, the operation handle 35 and the mounting member 31 are coaxially disposed.

In addition, the operation handle 35 has such a shape that the outer periphery thereof extends outwardly beyond the outer periphery of the brim portion 31B. Accordingly, when the overflow port side mechanism 3 is viewed from the water-containing space of the bath tub 100 so as to face the surface of the operation handle 35, a part of the mounting member 31 which protrudes from the surface of the sidewall 102 is entirely covered by and hidden behind the operation handle 35.

The operation handle 35 is provided with a ring-shaped outer periphery facing portion 35A along the outer periphery thereof, which faces the surface of the sidewall 102. The outer periphery facing portion 35A has such a shape that follows the surface of the sidewall 102 facing thereto at least when the operation handle 35 is rotated to the position to open the drain port 103.

In this embodiment, the portion of the sidewall 102 which faces the outer periphery facing portion 35A is a flat surface, and the outer periphery facing portion 35A is a plane parallel to the corresponding surface of the sidewall 102. Thus, in this embodiment, the shape of the outer periphery facing portion 35A always (regardless of the rotation position of the operation handle 35) follows the surface of the corresponding portion of the sidewall 102 facing thereto.

In addition, in this embodiment, as described below, an amount of protrusion of the operation handle 35 with respect to the surface of the sidewall 102 is changed corresponding to the open or closed state of the drain port 103. The amount of protrusion of the operation handle 35 with respect to the surface of the sidewall 102 is set such that, when the drain port 103 is open, the outer peripheral portion of the operation handle 35 is positioned on a lateral side of the buffer member 6 and the brim portion 31B (in this embodiment, such that almost the entire outer peripheral portion of the buffer member 6 and the entire outer peripheral portion of the brim portion 31B are overlap with the operation handle 35, when the operation handle 35 is viewed from the outer peripheral side).

The transmission member 4 is formed of a metal wire, for example, and disposed within a tubular shell portion 41 so as to be reciprocally movable. The driving force generated by the pivoting operation of the operation handle 35 is transmitted by the reciprocal motion of the transmission member 4 to the plug lid 24, resulting in an up-down movement of the plug lid 24. In addition, in this embodiment, moving the plug lid 24 up and down makes the transmission member 4 reciprocate so as to rotate the operation handle 35.

Figure 4:
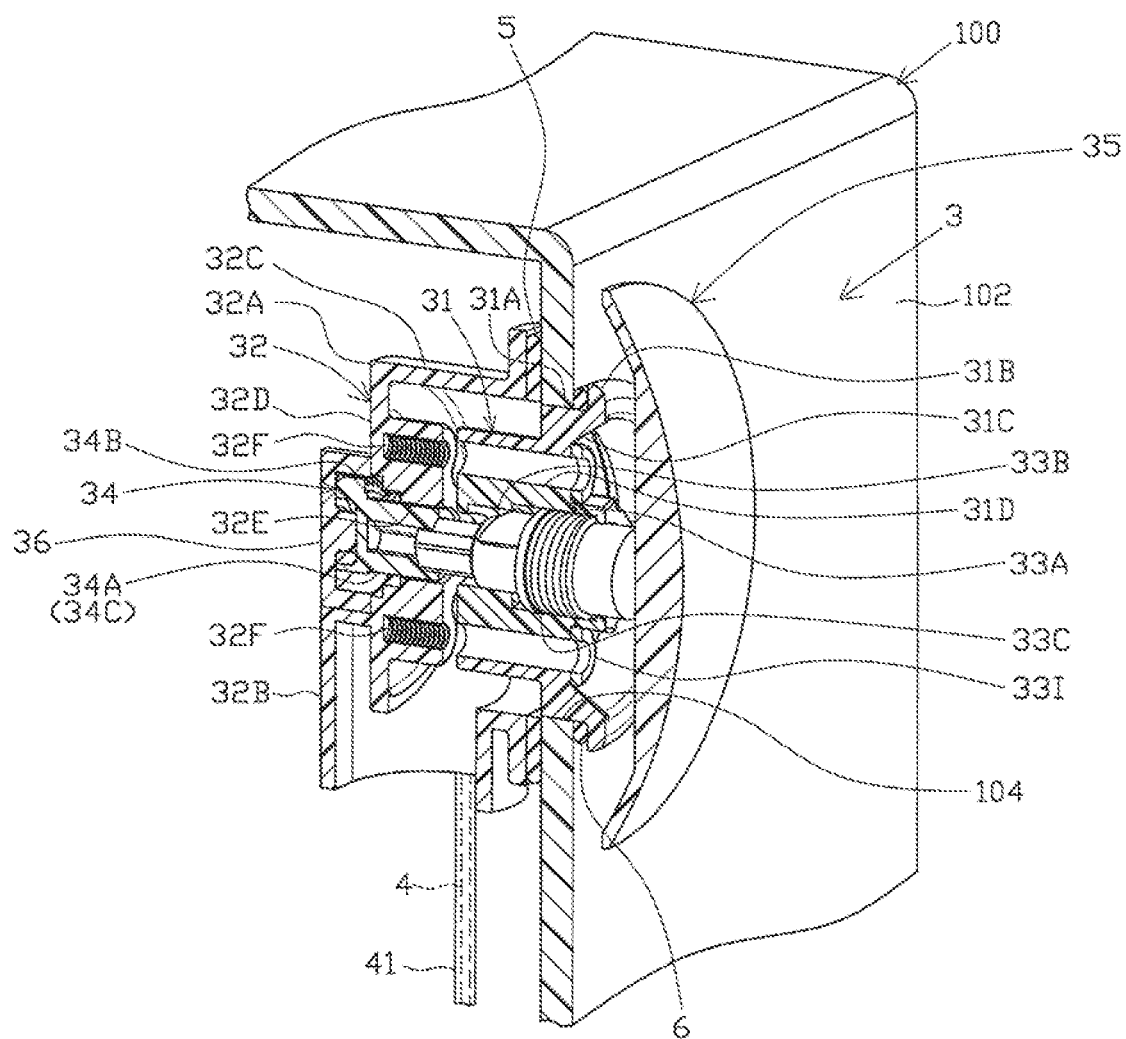
FIG. 4 is a diagram illustrating a partially cut-away perspective view showing a position of an operation handle when a drain port is closed.

Next, by referring to FIGS. 1 and 4, operation of each part when the operation handle 35 is rotated, positional relationships between the operation handle 35 and the sidewall 102, and the like are explained. FIG. 1 shows the operation handle 35 and other elements when the drain port 103 is open, while FIG. 4 shows the operation handle 35 and other elements when the drain port 103 is closed.

When the operation handle 35 rotates in a first (one) direction so as to bring the drain port 103 from an open state to a closed state thereof, the shaft 33B and the interlock portion 34A also rotate in the first direction together with the operation handle 35. Since the shaft-side contact portion 33G is maintained in contact with the holder-side contact portion 33E by the elastic member 33C, the shaft-side contact portion 33G slides on and along the holder-side contact portion 33E as the shaft 33B rotates. As a result, the shaft 33B moves along the central axis thereof in a direction in which the operation handle 35 protrudes from the surface of the sidewall 102 (toward the right in the drawings), such that the amount of protrusion of the operation handle 35 with respect to the surface of the sidewall 102 increases (see FIG. 4). This makes a rather large gap formed between the operation handle 35 and the surface of sidewall 102. If the operation handle 35 continues rotating in the first direction, the above-mentioned protrusion provided on the gear portion 34B eventually comes into contact with the case 36 so as to prevent further rotation of the operation handle 35.

In addition, the rotation of the interlock portion 34A in the first direction makes the rack portion and the transmission member 4 connected thereto move forward, whereby the support shaft 23A and the plug lid 24 move downward so as to close the drain port 103.

As described above, in accordance with this embodiment, the amount of protrusion of the operation handle 35 from the surface of the sidewall 102 becomes rather large when the drain port 103 is closed.

In this embodiment, when the drain port 103 is in its open state, for example, by stepping on the plug lid 24, a downward force can be applied to the plug lid 24 to make it move downward so as to close the drain port 103. That is, the drain port 103 can be closed by a simple operation such as stepping thereon without using the operation handle 35. In addition, when the drain port 103 is closed, the transmission member 4 is moved forward by the downward movement of the plug lid 24, whereby the operation handle 35 rotates in the first direction so as to increase the amount of protrusion of the operation handle 35 from the surface of the sidewall 102.

On the other hand, when the operation handle 35 rotates in a second (the other) direction so as to bring the drain port 103 from a closed state to an open state thereof, the shaft 33B and the interlock portion 34A also rotate in the second direction together with the operation handle 35. As the shaft 33B rotates, the shaft-side contact portion 33G slides on and along the holder-side contact portion 33E, whereby the shaft 33B moves along the central axis thereof in a direction opposite to the direction in which the operation handle 35 protrudes. As a result, the amount of protrusion of the operation handle 35 with respect to the surface of the sidewall 102 decreases (see FIG. 1), thereby making the gap between the operation handle 35 and the surface of sidewall 102 very small (in this embodiment, the outer peripheral portion of the operation handle 35 is almost in contact with the sidewall 102 such that there is no or little gap between the operation handle 35 and the surface of the sidewall 102). If the operation handle 35 continues rotating in the second direction, the ring-shaped protrusion 33F eventually comes into contact with the step portion 33D so as to prevent further rotation of the operation handle 35. In this embodiment, the protrusion formed on the gear portion 34B, the case 36, the ring-shaped protrusion 33F, and the step portion 33D together form a pivoting range regulation mechanism.

In addition, the rotation of the interlock portion 34A in the second direction makes the rack portion and the transmission member 4 connected thereto move backward, whereby the support shaft 23A and the plug lid 24 move upward so as to open the drain port 103.

As described above, in accordance with this embodiment, the amount of protrusion of the operation handle 35 from the surface of the sidewall 102 becomes rather small when the drain port 103 is open.

As described above in detail, in accordance with this embodiment, when the drain port 103 is open, that is, draining is being performed through the drain port 103 and there is no or little draining through the overflow port 104, the amount of protrusion of the operation handle 35 from the surface of the sidewall 102 is rather small. Accordingly, the operation handle 35 is not such an obstacle that convenience in using peripheral equipment of the bath tub 100 (for example, a shower) can be improved. In addition, an integration of the bath tub 100 and the operation handle 35 is improved so as to provide a tidy and nice looking, realizing the good quality of appearance. Furthermore, safety may also be improved by reducing a risk of such a situation that a hand or the like is caught by the operation handle 35.

On the other hand, when the drain port 103 is closed with the plug lid 24, that is, the drainage may be performed through the overflow port 104, the amount of protrusion of the operation handle 35 becomes greater than that when the drain port 103 is open. Accordingly, the gap between the operation handle 35 and the sidewall 102 can be increased so as to secure a sufficient draining efficiency at the overflow port 104.

In addition, by making the amount of protrusion of the operation handle 35 rather large, cleaning of the portion between the operation handle 35 and the side wall 102 becomes easier.

Furthermore, in accordance with the present embodiment, the handle moving mechanism 33 for moving the operation handle 35 is realized using a very simple structure. Thus, a cost for manufacturing the drain plug device 1 can be effectively reduced. A risk of troubles such as malfunction in the handle moving mechanism 33 can also be reduced more certainly.

When the drain port 103 is open, the outer periphery facing portion 35A of the operation handle 35 can follow the surface of the sidewall 102 facing thereto. Therefore, when the drain port 103 is open, the gap between the outer peripheral of the operation handle 35 and the sidewall 102 can further be reduced, whereby when the peripheral equipment of the bath tub 100 is used, the operation handle 35 is not such an obstacle that convenience of the use is further enhanced. In addition, the integrity of the bath tub 100 and the operation handle 35 is dramatically improved, thereby realizing an extremely good quality of appearance. Furthermore, superior safety is also obtained by further reducing a risk of such a situation in which a hand or the like is caught by the operation handle.

Also, when the drain port 103 is open, the outer peripheral portion of the operation handle 35 is arranged in a position that covers the lateral side of the brim portion 31B and buffer member 6. Thus, the amount of protrusion of the operation handle 35 with respect to the sidewall 102 is reduced to be sufficiently small so as to further enhance the convenience of use, safety, and the like.

Furthermore, when viewed from the outer peripheral side of the operation handle 35, the brim portion 31B and the buffer member 6 are hidden behind the operation handle 35 so as to provide a nicer looking, whereby the quality of appearance is further improved.

In addition, the protrusion provided to the gear portion 34B and the ring-shaped protrusion 33F and the like can prevent over rotation of the operation handle 35. Accordingly, malfunction or breakdown of the drain plug device 1 due to an over rotation of the operation handle 35 is surely prevented.

Also, in accordance with this embodiment, a simple operation such as steeping on the plug lid 24 can close the drain port 103, while the amount of protrusion of the operation handle 35 become larger than that when the drain port 103 is open, whereby the convenience for a user is further improved.

It should be noted that the present invention is not limited to the disclosure of the above-mentioned embodiment, and may be implemented in the following manner. Of course different applications and modifications not mentioned below can also be possible.

(a) Although both of the holder-side contact portion 33E and the shaft-side contact portion 33G have respective slopes in the embodiment described above, only one of the contact portions 33E and 33G may be formed into a slope.

(b) Although the shaft-side contact portion 33G is in pressure contact with the holder-side contact portion 33E biased by the elastic member 33C in the embodiment described above, it is not necessary to provide the elastic member.

Accordingly, for example, a spiral-like groove which inclined with respect to the circumferential direction of the holder 33A may be formed on the inner wall of the holder 33A, and a portion of the holder 33A having the spiral-like groove can serve as the holder-side contact portion. A protrusion may be formed on the shaft 33B as the shaft-side contact portion 33G so as to get into the spiral-like groove. That is, the shaft 33B spirally engages with the holder 33A. According to this configuration, the elastic member 33C can be omitted, and when the operation handle 35 is rotated, the shaft-side contact portion slides along the holder-side contact portion so as to move the shaft 33B along the central axis thereof, making it possible to change the amount of protrusion of the operation handle 35 with respect to the sidewall 102.

(c) In the embodiment described above, the portion of the sidewall 102 which faces the outer periphery facing portion 35A has a flat surface, and thus the shape of the outer periphery facing portion 35A always (regardless of the rotation position of the operation handle 35) follows the surface of the portion of the sidewall 102 to which it faces.

Figure 5:
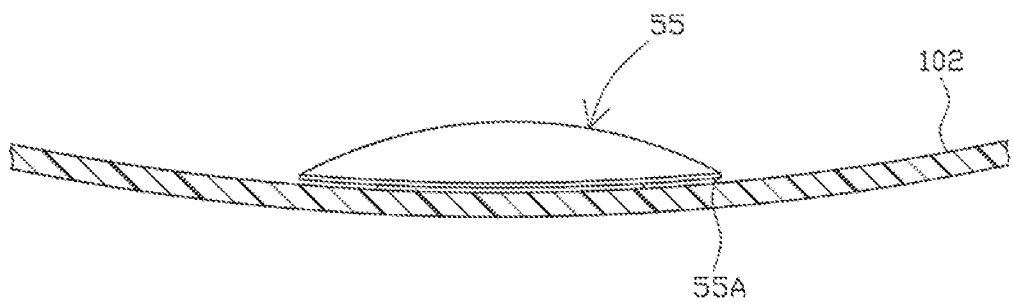
FIG. 5 is a diagram illustrating a partially cut-away perspective view showing the operation handle when the drain port is opened in accordance with another embodiment.
Figure 6:
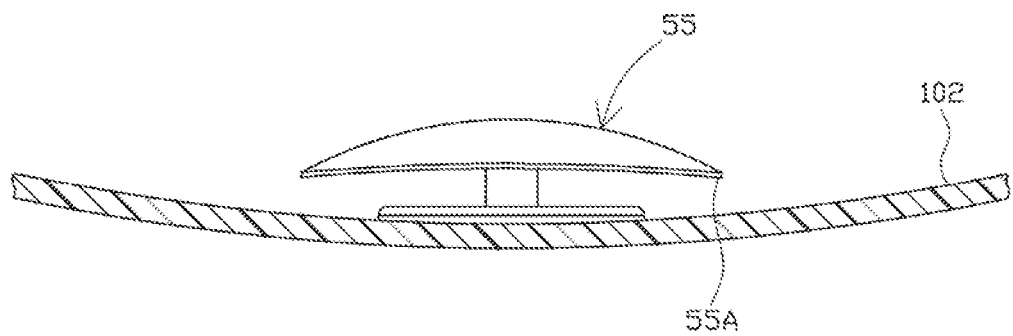
FIG. 6 is a diagram illustrating a partially cut-away perspective view showing the operation handle when the drain port is closed in accordance with another embodiment.

However, as shown in FIGS. 5 and 6, if at least a portion of the sidewall 102 which faces the outer periphery facing portion 55A has a curved surface, the outer periphery facing portion 55A may have such a shape that follows the surface of the sidewall 102 which faces the outer periphery facing portion 55A only when the operation handle 55 is arranged in a position to open the drain port 103. That is, as shown in FIG. 5, the shape of the outer periphery facing portion 55A may be configured so as to follow the surface of the sidewall 102 when the drain port 103 is open, while it does not follow the surface of the sidewall 102 when the drain port 103 is closed.

(d) In the embodiment described above, an over rotation of the operation handle 35 is suppressed by the protrusion provided on the gear portion 34B which comes into contact with the case 36 when the operation handle 35 further rotates in the first direction.

Figure 7:
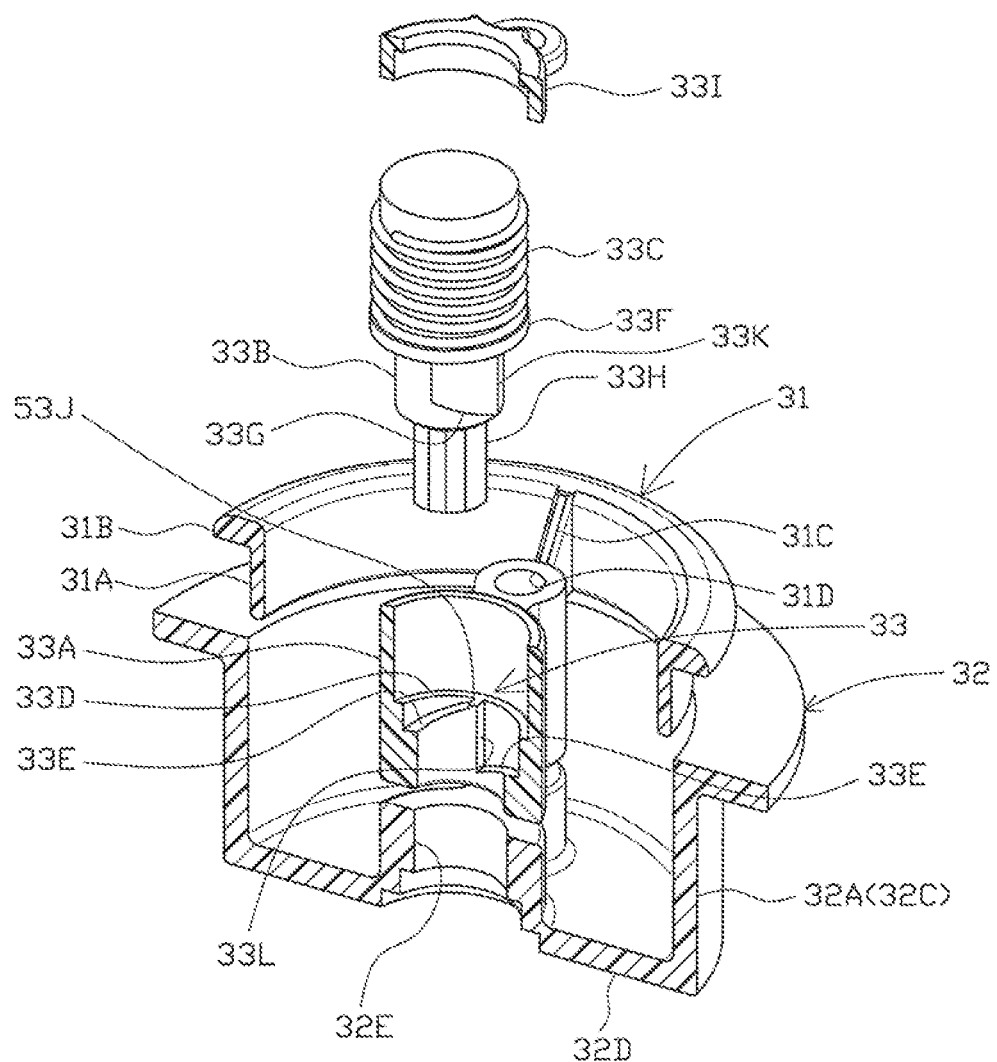
FIG. 7 is a diagram illustrating an exploded perspective view of the mounting member and the like showing a protruding portion in accordance with another embodiment.

On the other hand, as shown in FIG. 7, it is also possible to prevent the over rotation of the operation handle 35 in the first direction by providing a protrusion 53J at an end edge of the holder-side contact portion 33E so as to protrude toward the edge, such that a protruding convex portion 33K of the shaft 33B having the shaft-side contact portion 33G on a surface thereof comes into contact with the protrusion 53J when the operation handle 35 further rotates in the first direction. In this case, the protrusion 53J, the convex portion 33K, the ring-shaped protrusion 33F, and the step portion 33D together form the pivoting range regulation mechanism.

In addition, in the above-described embodiment, an over rotation of the operation handle 35 in the second direction is prevented by the ring-shaped protrusion 33F which comes into contact with the step portion 33D when the operation handle 35 further rotates in the second direction. On the other hand, the over rotation of the operation handle 35 in the second direction may also be prevented by the convex portion 33K which comes into contact with a step-like vertical portion 33L provided on the inner wall of the holder 33A and extending in the axis direction of the holder 33A. In this case, the protrusion 53J, the step-like vertical portion 33L, and the convex portion 33K together form the pivoting range regulation mechanism.

The over rotation of the operation handle 35 may also be restricted by the rack portion which comes into contact with the overflow pipe 32 or a certain member fixed thereto (for example, the case 36).

(e) Although in the above-described embodiment, the amount of protrusion of the operation handle 35 with respect to the surface of the sidewall 102 is set such that, when the drain port 103 is open, the outer peripheral portion of the operation handle 35 is positioned on the lateral side of the brim portion 31B and the buffer member 6, the amount of protrusion of the operation handle 35 when the drain port 103 is open is not limited to this. Accordingly, for example, when the drain port 103 is open, the amount of protrusion of the operation handle 35 may be set such that the outer peripheral portion of the operation handle 35 is positioned on a lateral side of the brim portion 31B only. However, in the light of the quality of appearance, it is preferable to minimize the amount of protrusion of the operation handle 35 with respect to the surface of the sidewall 102 when the drain port 103 is open.

(f) Although in the above-described embodiment the holder 33A is coupled to the mounting member 31 by the arm portions 31C, the holder 33A may be coupled to (integrally formed with) the overflow pipe 32.

(g) Although in the above-described embodiment the mounting member 31 and overflow pipe 32 are attached to the sidewall 102 by the spiral engagement of the male screw inserted in the mounting member 31 (the insertion hole 31D) and the female screw 32F, the attachment of the mounting member 31 and overflow pipe 32 to the sidewall 102 is not limited to this. Accordingly, for example, the mounting member 31 and overflow pipe 32 may be attached to the sidewall 102 by forming male screws on the outer circumferential wall of the main body 31A of the mounting member 31, forming female screws on the inner circumferential wall of the cylindrical portion 32C of the overflow pipe 32, and engaging the male screw formed on the main body 31A with the female screw formed on the cylindrical portion 32C, thereby sandwiching the sidewall 102 between the brim portion 31B and the overflow pipe 32.

(h) Although the bath tub 100 is the example of the tank in the embodiment described above, the tank to which the present invention is applied is not limited to the bath tub. Thus, for example, the present invention is also applicable to a washstand, sink, and the like.

(i) Although in the above-described embodiment the drain port 103 is closed by the plug lid 24 (the packing portion 24B) which comes into contact with the drain port member 21, the drain port 103 may be closed by the plug lid 24 (the packing portion 24B) which comes into contact with the bath tub 100 (the bottom wall 101).

The invention claimed is:

1. A drain plug device provided to a tank having a bottom wall, a sidewall standing from the bottom wall, a drain port provided to the bottom wall, and an overflow port provided to the sidewall, the drain plug device comprising:
   a plug lid configured to open and close the drain port by moving upward and downward with respect to the bottom wall of the tank, respectively;
   a mounting member inserted in the overflow port, the mounting member being provided with an opening at one end thereof and an inner space such that water in the tank enters from the opening and flows through the inner space, the mounting member having a brim portion surrounding the opening, the brim portion extending outwardly along a surface of the side wall so as to be in direct or indirect contact with the surface of the sidewall;
   an operation handle provided corresponding to the opening of the mounting member so as to protrude from the surface of the sidewall, the operation handle being pivotable around an axis perpendicular to the sidewall, the operation handle including a peripheral portion which is a portion extending outwardly further than an outer circumferential edge of the brim portion viewed from above along the axis such that at least part of the peripheral portion directly faces the surface of the side wall without the brim portion intervening therebetween, and an upper surface of the peripheral portion gradually reducing a height thereof with respect to the surface of the side wall as the peripheral portion extending toward an outer edge thereof, such that the upper surface forms a slope ending at the outer edge of the peripheral portion and obliquely approaching the surface of the sidewall;
   a transmission member configured to transmit a driving force generated by a pivoting operation of the operation handle to the plug lid so as to move the plug lid up and down; and
   a handle moving mechanism including a holder and a shaft, capable of moving the operation handle along a protrusion direction of the operation handle with respect to the surface of the sidewall,
   wherein the handle moving mechanism is configured such that an amount of protrusion of the operation handle with respect to the surface of the sidewall when the drain port is open is smaller than an amount of protrusion of the operation handle with respect to the surface of the sidewall when the drain port is closed, and
   wherein when the drain port is open, the outer edge of the peripheral portion of the operation handle is positioned closer to the surface of the sidewall than an upper surface of the outer circumferential edge of the brim portion.

2. The drain plug device according to claim 1,
   wherein the holder is in a cylindrical shape and provided to an inner circumference of the mounting member so as to extend along a moving direction of the operation handle, while the shaft is provided to an inner circumference of the holder behind the operation handle, the shaft being configured to pivot around a central axis thereof as a rotational axis in accordance with the pivoting operation of the operation handle,
   wherein the handle moving mechanism further includes:
      a holder-side contact portion provided to the inner circumference of the holder; and
      a shaft-side contact portion provided to an outer circumference of the shaft,
   wherein the holder-side contact portion is in contact with the shaft-side contact portion, and at least one of the holder-side contact portion and the shaft-side contact portion is slanted with respect to a circumferential direction of the central axis,
   and wherein the shaft-side contact portion is configured to slide the holder-side contact portion in accordance with the pivoting operation of the operation handle, such that the amount of protrusion of the operation handle with respect to the surface of the sidewall is changed by a movement of the shaft along the central axis thereof.

3. The drain plug device according to claim 1, further comprising:
   a pivoting range regulation mechanism for regulating a range of the pivoting operation of the operation handle.

4. The drain plug device according to claim 1, wherein the outer edge of the peripheral portion of the operation handle has a shape following the surface of the sidewall facing thereto when the operation handle is arranged at a position for opening the drain port.

5. The drain plug device according to claim 1, further comprising:
   a buffer member which is elastically deformable, provided between the sidewall and the brim portion so as to be sandwiched therebetween, wherein the amount of protrusion of the operation handle with respect to the surface of the sidewall when the drain port is open is set such that the peripheral portion of the operation handle surrounds an outer circumferential edge of the buffer member, whereby the brim portion and the buffer member are accommodated within the operation handle when the drain port is open.

6. The drain plug device according to claim 1, wherein the plug lid moves downward by applying a downward force thereto when the drain port is open, thereby closing the drain port, while the operation handle pivots and protrudes such an amount greater than the amount of protrusion of the operation handle with respect to the surface of the sidewall when the drain port is open.

7. The drain plug device according to claim 1, wherein the slope of the peripheral portion has a curved surface.

8. The drain plug device according claim 1, wherein the amount of protrusion of the operation handle with respect to the surface of the sidewall when the drain port is open is set such that at least part of the outer edge of the peripheral portion of the operation handle is positioned along the surface of the side wall such that the at least part of the outer edge overlaps with corresponding part of the outer circumferential edge of the brim portion.

* * * * *